United States Patent [19]
Forster

[11] 3,732,737
[45] May 15, 1973

[54] APPARATUS FOR USE IN WHEEL COUNTERBALANCING

[75] Inventor: Brian Michael Forster, Harthill, England

[73] Assignee: G.K.N. Birfield Transmissions Limited, Birmingham, England

[22] Filed: Jan. 21, 1971

[21] Appl. No.: 108,552

[30] Foreign Application Priority Data

Jan. 27, 1970 Great Britain......................3,867/70

[52] U.S. Cl..................................................73/462
[51] Int. Cl..........................................G01m 1/22
[58] Field of Search................73/460, 459, 462–467, 73/471–479

[56] References Cited
UNITED STATES PATENTS 2,983,148   5/1961   White..............................73/479 X
3,184,976   5/1965   Greiner..............................73/462

FOREIGN PATENTS OR APPLICATIONS 964,937   7/1964   Great Britain........................73/471

Primary Examiner—James J. Gill
Attorney—Holman & Stern

[57] ABSTRACT

In apparatus for wheel counter-balancing a wheel to be balanced is mounted on a shaft for rotation therewith and a digital read-out is obtained for the positions and magnitudes of the weights required for balancing. Clock pulses for the digital read-out are derived from a pulse generator in driving connection with the shaft.

5 Claims, 7 Drawing Figures

APPARATUS FOR USE IN WHEEL COUNTERBALANCING

BACKGROUND OF THE INVENTION

1. Field of the Invention

This invention relates to a apparatus for use in, wheel counterbalancing.

2. Description of the Prior Art

A counterbalancing apparatus is known in which movements of bearings rotatably supporting a rotating shaft carrying the article to be balanced are detected and analyzed to determine the positions and values of the counterbalance weights to be added to correct imbalance. In such apparatus it is necessary manually to adjust the rate of pulse generation of a pulse generator which feeds clock pulses to a digital counter displaying the angular position of the required counterbalance to ensure that said rate corresponds to the rotational speed of the shaft in order that a correct indication shall be given of said angular position.

SUMMARY OF THE INVENTION

In order to avoid the necessity to calibrate a pulse generator as in the prior art the invention provides apparatus in which the clock pulses are derived directly from the shaft carrying the wheel to be balanced.

DESCRIPTION OF THE PREFERRED EMBODIMENT

Figure 1:
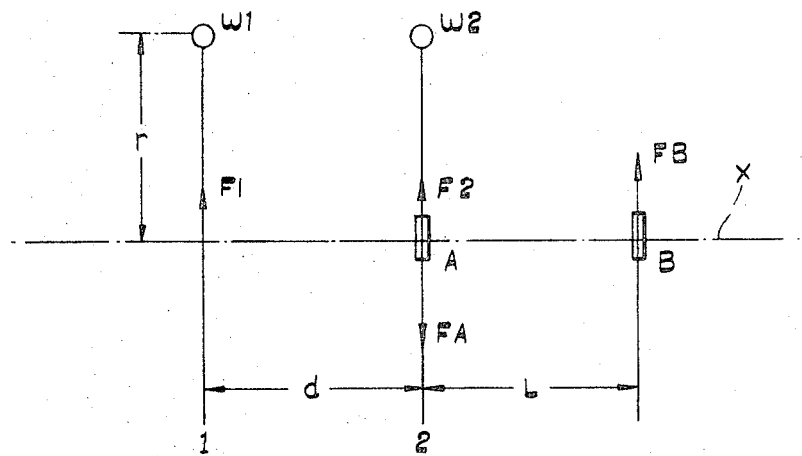
FIG. 1 is a diagrammatic representation of the forces acting on an unbalanced wheel.

The apparatus includes a shaft 10 which is free to rotate in a pair of spaced bearings A and B which bearings are self-aligning bearings contained in housings 11 and 12 respectively. The bearing housings 11 and 12 have arms such as 100 whereby they are mounted on vertical spring plates 13 and 14 secured to a base plate 101 and which allow the whole shaft assembly to deflect in a horizontal plane when subjected to out of balance forces produced by an unbalanced wheel. The distance between the bearings A and B is approximately 20 c.m. and the shaft 10 protrudes approximately the same distance beyond the front bearing A to enable the wheel to be mounted and positioned. The wheel is fixed to the shaft by a hub and positioned so that the plane of the inner rim of the wheel is in perpendicular alignment with the front bearing A, i.e., the plane of the inner rim of the wheel contains bearing A. The shaft 10 is arranged for rotation at a speed of up to 700 r.p.m. by a one horse-power 3-phase electric motor 15 which has a drive pulley 16 on which a belt 17 is entrained to transmit drive to a pulley 18 keyed to the shaft 10.

Vibrations of the shaft 10 caused by an unbalanced wheel are sensed by transducers comprising a pair of piezo-electric crystals 19 mounted on fiberglass boards 20 and coupled to the bearing housings 11 and 12 by short lengths of steel wire 21 which are clamped in clamps 102 on the housings. The fiber-glass boards 20 are fixed onto a rigid pillar 22 secured to the base plate 101 so that movements of the bearing housings relative to the base plate produce bending strains in the boards 20 and hence coupled strains in the crystals 19. The crystals thus produce voltages across their terminals which are dependent on the vibrations at each of the bearing housings A and B. The transducers 19 have sinusoidal output voltages the amplitudes of which depend on the magnitude of the required out of balance weight and the phase angles of which depend on the position of the required out of balance weight within the wheel. It is from these signals, i.e. the sinusoidal output voltages, that the magnitude and position of the weights to be added to the outer and inner rims of the wheel under test are computed.

In operation, the operator sets the wheel size on a pair of controls (not shown) i.e. a wheel width control and a wheel radius control and initiates rotation of the wheel up to a balancing speed. While the machine is operating an electronic circuit, see FIGS. 6 and 7, continuously computes and displays in digital form the counterbalance weights to be added to the inner and outer rims of the wheel and their positions. The displayed values for each rim are updated during rotation of the wheel and, once the wheel is rotating at a predetermined speed, the displayed values are maintained and the wheel is brought to rest. The wheel is mounted so that one of the planes in which the counterbalance weights are to be added lies in the same plane as bearing A and as hereinafter explained the value and position of the counterbalance weight to be added in the plane remote from bearing A is proportional to the amplitude and phase angle of the voltage generated at bearing B and the value and position of the counterbalance weight to be added in the plane in line with bearing A is given by the amplitude and phase angles of the differences between the voltages generated at the two bearings.

In order to obtain the true value of the counterbalance weights to be added to the wheel, two constants for a wheel under test have to be taken into account. These are the rim width and the rim radius. A measuring device is therefore provided for determining these constants and the measuring device (not shown) may include a movable measuring stick for determining the rim radius, the value of the rim radius being read off on a scale marked on the measuring stick, and a pair of calipers for measuring the rim width. Before commencement of rotation of the wheel, information regarding these constants is fed into the electrical system of the apparatus by means of the appropriate controls (not shown) on a control panel .

If we now consider FIG. 1 of the drawings then the disturbing weight causing the out of balance of the rotating mass may be resolved into two components acting in a pair of spaced planes, namely plane 1 containing the outer rim of the wheel and plane 2 containing the inner rim of the wheel. Assuming weights $W_1$ and $W_2$ to be the resolved values of the out of balance weight acting in planes 1 and 2 respectively and effective at the wheel rim, i.e. at a distance r from the reference axis x, then, if equal weights $W_A$ and $W_B$ are added each at a position diametrically opposite on each rim to the corresponding weight $W_1$ or $W_2$, the rotating mass will be statically and dynamically balanced. As described above bearing A lies in the same plane as the inner rim of the wheel, i.e. in plane 2.

In the following discussion of the mathematical principle of operation of the apparatus:

$W_A$ is the weight to be added in plane 1,
$W_B$ is the weight to be added in plane 2,
$W_1$ is the amplitude of the out of balance weight resolved into plane 1,
$\theta$ is the angular position of the out of balance weight resolved into plane 1 with respect to a reference position on the shaft,
$W_2$ is the amplitude of the out of balance weight resolved into plane 2,
$\phi$ is the angular position of the out of balance weight resolved into plane 2 with respect to the same reference position,
$F_A$ is the reaction force on bearing A due to the out of balance weight,
$F_B$ is the reaction force on bearing B due to the out of balance weight
$F_1$ is the force in plane 1 due to out of balance,
$F_2$ is the force in plane 2 due to out of balance,
$L$ is the distance between bearings A and B (constant),
$r$ is the radius of the rim of the rotating mass,
$d$ is the distance between the front and rear rims of the rotating mass,
$w$ is the angular velocity of the rotating mass,
$V_A$ is the voltage output of transducer at bearing A,
$V_B$ is the voltage output of transducer at bearing B,
$V_1$ is a voltage proportional to out of balance weight $W_1$ in plane 1,
$V_2$ is a voltage proportional to out of balance weight $W_2$ in plane 2,
$K_T$ is the transducer constant, (volts per unit force)
$K$, is a constant $= K_T W^2/g$
$K_1$ is a constant $= Lg/K_T W^2 = L/K$ and
$K_2$ is a constant $= g/K_T W^2 = 1/K = K_1/L$
$g$ is a constant being the acceleration due to gravity Taking moments about bearing B $$\dot{F}_1 (L - d) = \dot{F}_2 L = \dot{F}_A L \qquad (1)$$

where $$\dot{F}_1 = (W_1/g) r w^2 \; \angle\theta \qquad (2)$$

and $$\dot{F}_2 = (W_2/g) r w^2 \; \angle\phi \qquad (3)$$

From (1)

$$\dot{F}_2 = \dot{F}_A - \dot{F}_1 - \dot{F}_1(d/L) \qquad (4)$$

Taking moments about bearing A $$\dot{F}_1 d = \dot{F}_B L \qquad (5)$$

From (5)

$$\dot{F}_1 = \dot{F}_B (L/d) \qquad (6)$$

Substituting (6) in (2)

$$\dot{F}_2 = \dot{F}_A - (\dot{F}_B L/d) - \dot{F}_B \qquad (7)$$

Multiplying (6) and (7) through by $K_T$ we have $$K_T \dot{F}_1 = K_T (\dot{F}_B L/d) \qquad (8)$$

and $$K_T \dot{F}_2 = K_T \dot{F}_A - (K_T \dot{F}_B L/d) - K_T \dot{F}_B \qquad (9)$$

But $$\dot{V}_1 = K_T \dot{F}_1 \qquad (10)$$

$$\dot{V}_2 = K_T \dot{F}_2 \qquad (11)$$

$$\dot{V}_A = K_T \dot{F}_A \qquad (12)$$

and $$\dot{V}_B = K_T \dot{F}_B \qquad (13)$$

Substituting (10) and (13) in (8) we have $$\dot{V}_1 = \dot{V}_B(L/d) \qquad (14)$$

and substituting (11), (12) and (13) in (9) we have $$\dot{V}_2 = \dot{V}_A - \dot{V}_B(L/d) - \dot{V}_B \qquad (15)$$

But $$\dot{F}_1 = W_1(rw^2/g) \; \angle\theta \qquad (16)$$

and $$\dot{F}_2 = W_2(rw^2/g) \; \angle\phi \qquad (17)$$

Substituting (16) and (17) in (10) and (11) respectively.

$$\dot{V}_1 = K_T W_1(rw^2/g) \; \angle\theta \qquad (18)$$

and $$\dot{V}_2 = K_T W_2(rw^2/g) \; \angle\phi \qquad (19)$$

Substituting $K$ for $K_T w^2/g$ in (18) and (19) we have $$V_1 = K W_1 r \; \angle\theta \qquad (20)$$

and $$V_2 = K W_2 r \; \angle\phi \qquad (21)$$

Thus transposing (20)

$$W_1 \; \angle\theta = \dot{V}_1/rK \qquad (22)$$

and substituting (14) in (22)

$$W_1 \;\; \underline{/\theta} = \dot{V}_B \, (L/dr \, K) \tag{23}$$

substituting $K_1$ for $L/K$ $$W_1 \;\; \underline{/\theta} = (\dot{V}_B \, K_1)/(r \, d) \tag{24}$$

Transposing (21)

$$W_2 \;\; \underline{/\phi} = \dot{V}_2/rK \tag{25}$$

and substituting $K_2$ for $1/K$ $$W_2 \;\; \underline{/\phi} = \dot{V}_2 \, K_2/r \tag{26}$$

and substituting (15) in (26)

$$W_2 \;\; \underline{/\phi} = 1/r \, [\; \dot{V}_A \, K_2 - (\dot{V}_B \, K_1/d) - \dot{V}_B \, K_2] \tag{27}$$

Since the variables on the right hand side of expressions (24) and (25) are vector quantities, the module of the expressions are proportional to the weights to be added at each rim and the phase angles represent respectively the positions at which the weights must be added to each rim. Hence, weight to be added in plane 1, $W_a =$ $$W_1 = V_B \, K_1/rd \quad \text{(from 24)} \tag{28}$$

and in plane 2, $W_B =$ $$W_2 = 1/r \, V_A \, K_2 - (V_B K_1/d) - V_B K_2 \;] \quad \text{(from 27)} \tag{29}$$

The phase angles of the expressions (24) and (27) represent respectively the positions at which the weights must be added to each rim, $\underline{/\theta}$ and $\underline{/\phi}$.

Figure 6:
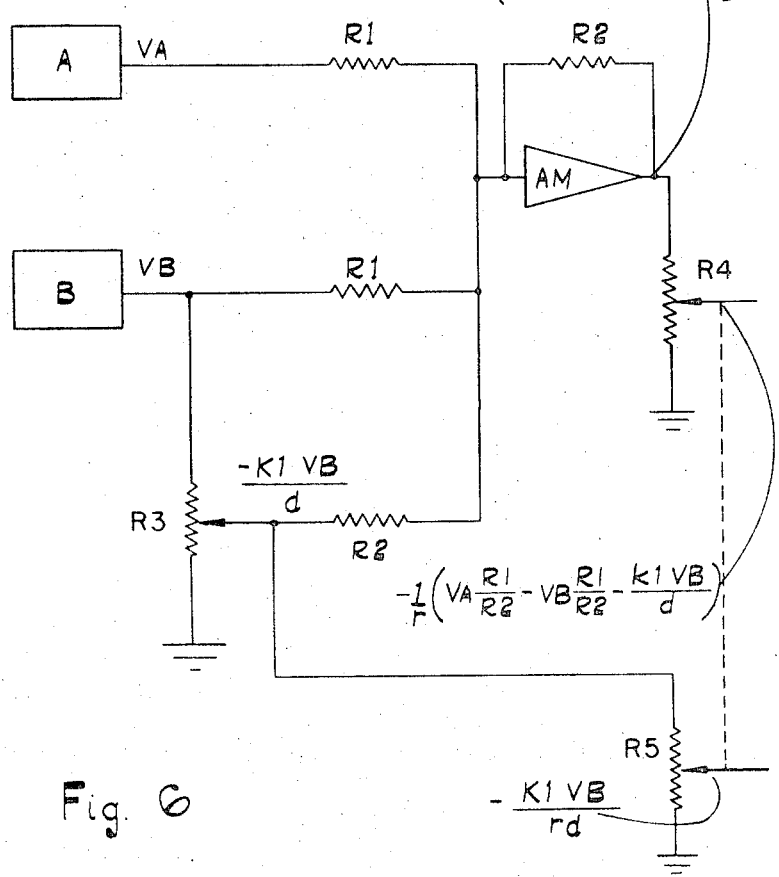
FIG. 6 is a circuit diagram showing part of the electrical circuitry of the apparatus and FIG. 7 is a block diagram showing the electrical circuitry of the apparatus.

Signals which are in the form of sinusoidal voltages from the transducers A and B mounted on the bearings are computed to obtain the expressions for the values and positions of the counterbalance weights as follows:

As shown in FIG. 6 the sinusoidal output voltage A from transducer A is added to the sinusoidal output voltage B from transducer B in operational amplifier A M. to which the transducers are connected in a circuit which includes a pair of resistances $R_1$ and a pair of resistances $R_2$. The values of the resistances $R_1$ and $R_2$ are chosen such that $K_2$ equals $R_1$ divided by $R_2$.

In addition a further voltage which is the output of transducer B modified by a first variable resistor $R_3$ by a factor proportional to the wheel width ($d$) is added at the input of the operational amplifier A M. After modification by a second variable resistor $R_4$ by a factor proportional to the wheel radius ($r$) the amplifier output voltage represents the weight and the position thereof to be added in plane 2. As shown in FIG. 6, compare expression (29) above.

The weight and the position thereof to be added in plane 1 is given by the voltage at the input of the wheel width control modified by a third variable resistor $R_5$ by a factor proportional to the wheel radius ($r$) as shown in FIG. 6, compare expression (28) above. The modulus of each voltage represents the weight to be added in the respective plane and the phase angle of the voltage represents its position.

The first variable resistor $R_3$ referred to above is settable in dependence on the rim width as measured by said pair of unshown calipers whilst the second and third variable resistors $R_4$ and $R_5$ are settable in dependence on the rim radius as measured by said measuring stick. The voltages produced by the circuit of FIG. 6 are analogue signals which are subsequently fed to analogue-to-digital convertor circuits.

Figure 2:
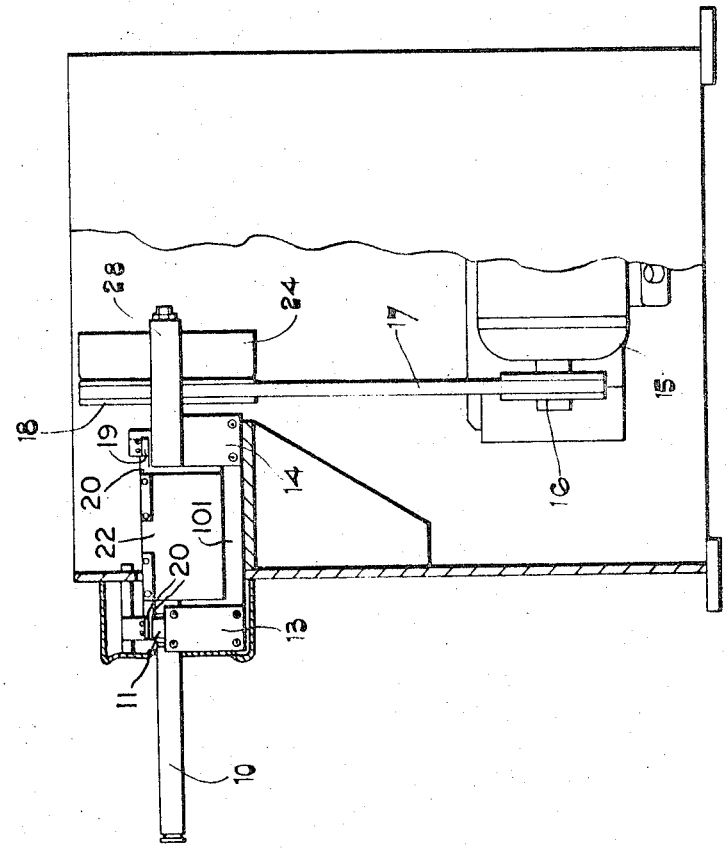
FIG. 2 is a sectional side view of the wheel balancing apparatus.
Figure 4:
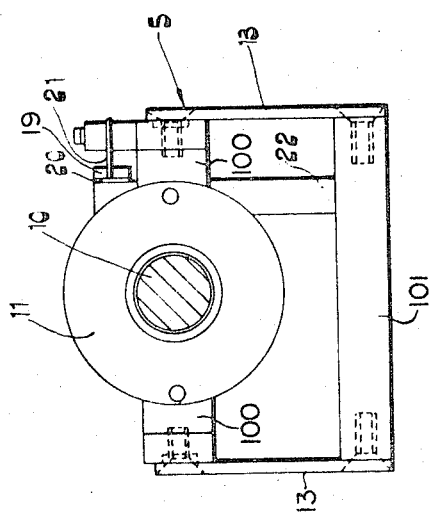
FIG. 4 is a view of the mounting means taken along the line 4—4 of FIG. 3.
Figure 3:
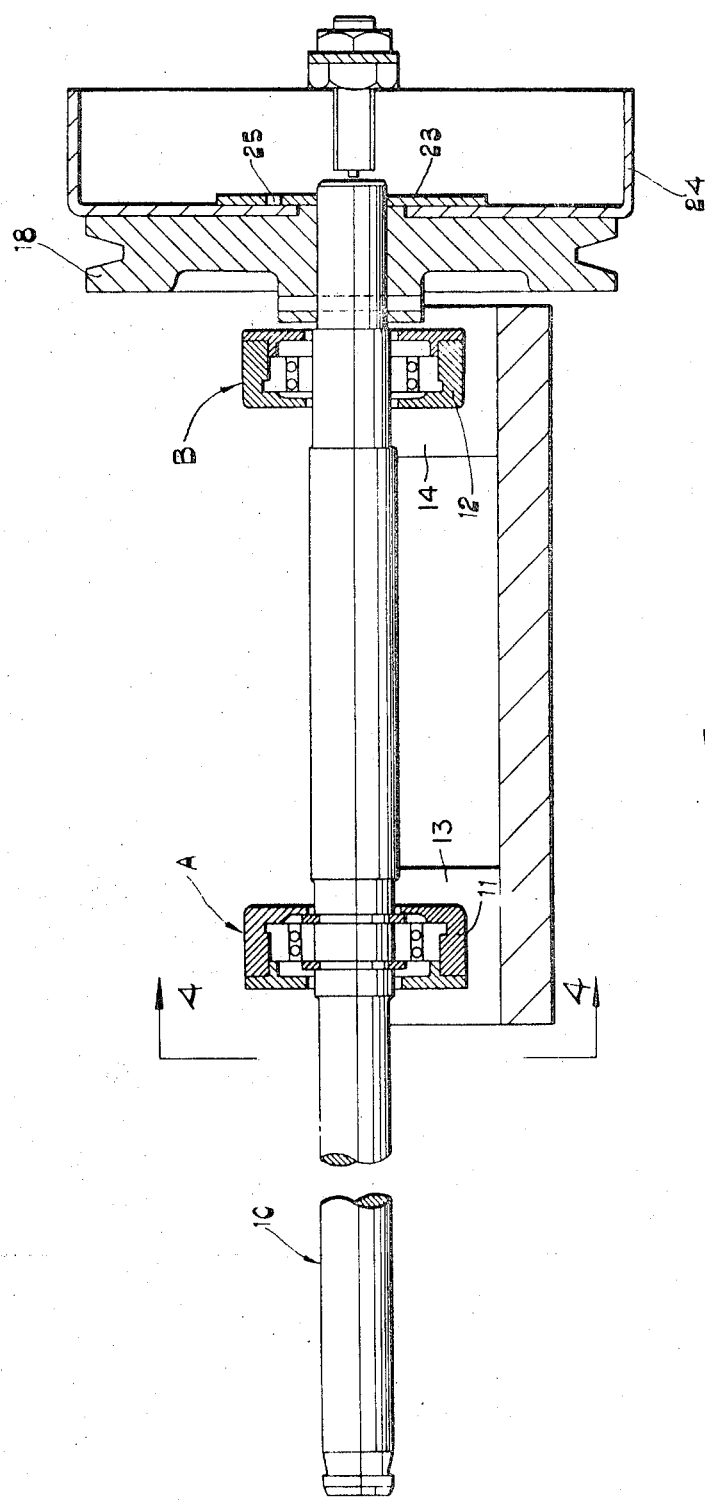
FIG. 3 is a sectional view showing the shaft on which a wheel to be counterbalanced is mounted.
Figure 5:
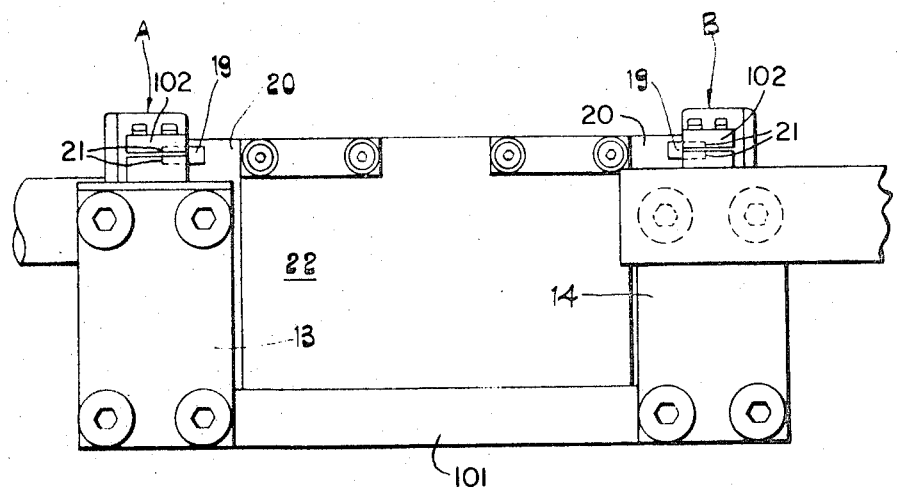
FIG. 5 is a view in the direction of the arrow 5 of FIG. 4.
Figure 7:
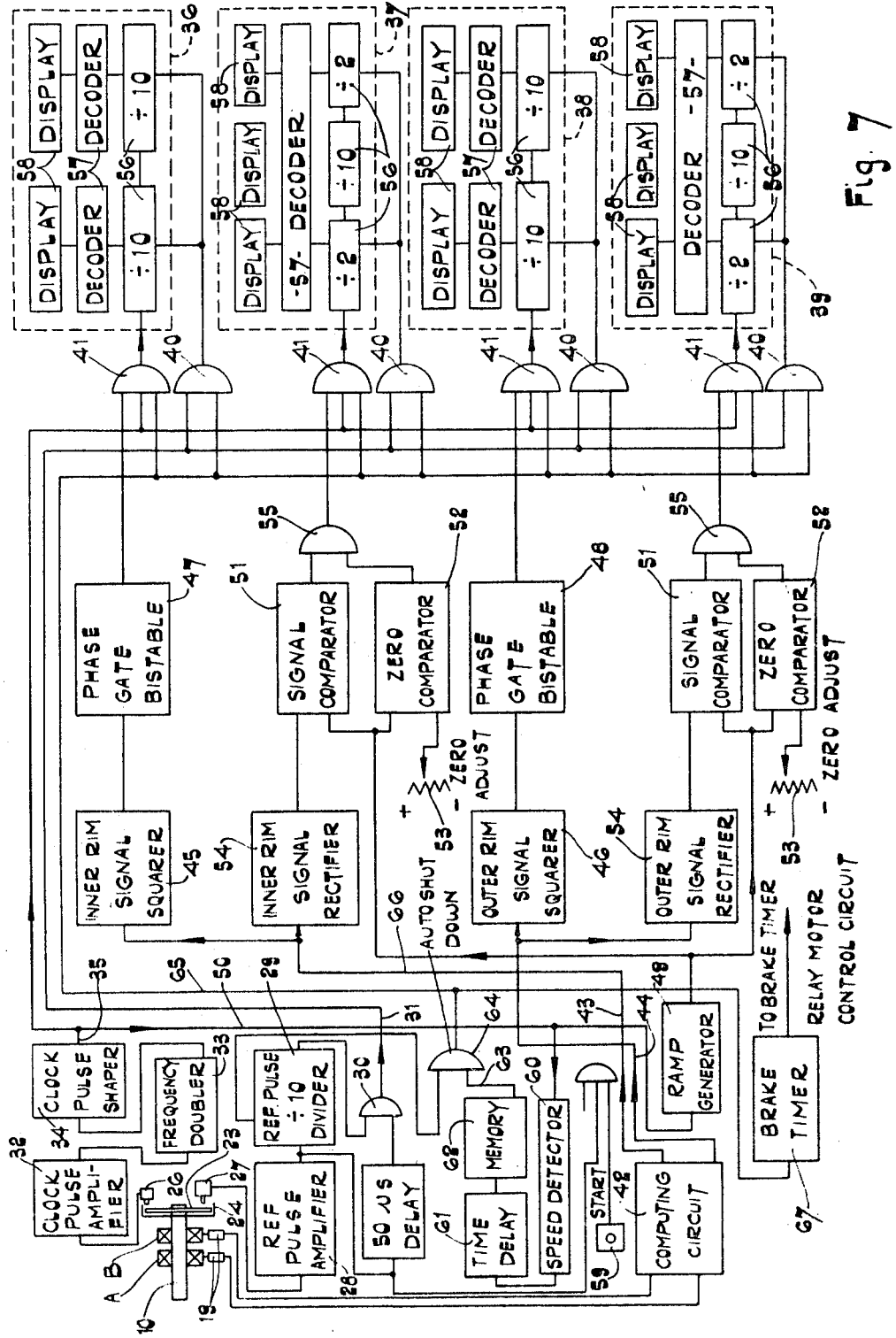

A ferromagnetic disc 23 is secured to the end of the shaft 10 adjacent the pulley 18, see FIGS. 3 and 7, and is contained within a graduated drum 24 see FIG. 2. The disc 23 has thirty six notches cut into its periphery and has a small hole 25 drilled into it at a position approximately two thirds of the disc radius from the axis of the shaft 10. This disc 23 is used to generate clock pulses required by the digital counters of the apparatus and also reference pulses. The pulses are derived from two magnetic transducers 26 and 27 each of which consists of a permanent magnet pole piece inside a coil. The transducers 26 and 27 are mounted on a bracket (not shown) and together with the disc 23 constitute an impulse generator and are positioned so that the tips of the pole pieces are in close proximity to the disc 23 and are respectively in line with the notches and the hole 25 formed in the disc. As the disc 23 rotates the changes in the air gap between the pole pieces and the disc 23 as a result of the notches and the hole generate voltage pulses in the coils of the transducers 26 and 27. The disc 23 and the transducer 26 generate thirty six clock pulses per revolution of the shaft 10 and the disc 23 and the transducer 27 generate one reference pulse per revolution of the shaft 10. The single called a reference pulse generated during each revolution, is applied to an amplifier 28 and the readout circuits of the apparatus are arranged to be reset once every 10 revolutions during each period of ten revolutions the phase and the amplitude of both signals are measured and the results stored and displayed until the next reset. To achieve the required frequency of the reference pulses their generated frequency is divided by 10 using a decade counter 29 (see FIG. 7) and a decoding gate 30 to obtain a reset pulse along a line 31 once every ten revolutions of the shaft. The clock pulses from transducer 26 are passed to an amplifier 32 and then to a frequency doubler 33 in which the number of pulses per revolution of the shaft 10 is doubled to 72 pulses per revolution thus giving one pulse per 5° of angular rotation of the shaft 10. The pulses from the frequency doubler 33 pass to a pulse shaper 34 which improves the pulse shape and transmits the clock pulses along a line 35.

The reference pulses may be generated, as shown, from the same disc as the clock pulses by the hole 25, or from a second wheel or disc with a single tooth. The phase of the reference pulse is related to a fixed scale on the graduated drum 24 and the scale provided acts as a guide to enable the operator to mount the counterbalance weight on the wheel at the positions displayed.

The apparatus includes four counters and display mechanisms indicated generally by reference numbers 36, 37, 38 and 39 and each reset pulse transmitted along line 31 changes the state of bistable gates 40, there being one gate associated with each of the digital counters and each time a gate 40 is opened resets the counter to zero and sets it to receive clock pulses.

To find the position at which a counterbalance weight is to be attached the phase of the computed signals is measured relative to some fixed reference on the shaft. Counters 36 and 38 are used to indicate the angular position of the counterbalance weights to be added in the two planes and pulses flow to counters 36 and 38 while the associated gate 41 is open. The sinusoidal output from the computing circuit of FIG. 6 designated by reference numeral 42 in FIG. 7 is formed into a square waveform and phase gate bistable 47 operates on the positive going edge of the squarer 45 output, thus producing a square waveform in phase with that at the output of the squarer but having half the frequency. This waveform is fed to logic gate 41 which allows clock pulses through while the waveform at the output of the phase gate bistable is positive. These clock pulses enter the counter provided it has been reset and enabled via logic gate 40. Thus a number of clock pulses are allowed to enter the counter during the period between the reset pulse enabling the counter and the output waveform of bistable 47 closing the logic gate at a point equivalent to the sinusoidal waveform passing through zero. Hence the figure displayed by the angular position display represents the angular rotation of the shaft between the generation of the reference pulse and the sinusoidal computed waveform passing through zero.

Each counter 36 and 38 is a decimal counter and is arranged to display a number corresponding to the number of clock pulses it receives. The accumulated count which is simultaneously displayed on the digital display tubes of the phase counters 36 and 38 represents the angular rotation of the shaft as described and the count is then held until the next sample period, that is, until the next reset pulse occurs at which time the counter is reset to zero on receipt of the reset pulse via gate 40 and the phase gate 41 is opened so that the counter can once more obtain a new sample. Since the clock pulses are generated by rotation of the shaft, each count of a angular position counter 36 or 38 represents an increment of angular rotation of the shaft irrespective of any speed variations which may occur. The required positions of both weights are physically related to the shaft when the apparatus stops by using the graduated drum 24 fixed to the shaft 10.

The value of the weight required to be added in either plane is also displayed on digital tubes using counters similar to angular position counters 36 and 38 but in this case it is the peak value of the computed signal which must be converted into a train of pulses and counted. The weight measuring circuit makes use of the ramp method of analogue to digital conversion using a staircase ramp. The staircase voltage ramp generator 49 is connected by a line 50 to line 35 to receive the clock pulses and on receipt of each clock pulse, the output voltage of the ramp generator 49 increases by 80 m.V. commencing at a voltage level of approximately 500 m.V. negative and rising in steps to approximately 5V positive.

To start the ramp, a reset pulse is fed via a circuit (not shown) to reset the output voltage of the ramp generator 49 to the 500 m.v. negative level. The clock pulses transmitted along lines 35 and 50 then step the ramp up to the 5 volt positive level at which the output voltage of the ramp generator is held until the next reset pulse occurs. The ramp output voltage is fed into two signal comparators 51 associated with the weight magnitude counters 37 and 39, there being a signal comparator 51 and a zero comparator 52 associated with each of said counters 37 and 39. In each zero comparator 52, the ramp output voltage is compared with a low dc voltage which can be adjusted from one volt negative to 1 volt positive by means of a potentiometer 53. The computed signal voltage obtained from the computing circuit 42 is rectified by a linear rectifier circuit 54 and then compared with the ramp voltage in the signal comparator 51. After the reset pulse occurs the ramp generator begins to step and when the output voltage of the ramp generator 49 exceeds the level set by the potentiometer 53, the output voltage of the zero comparator 52 changes from zero to 4 volts positive. This change in output voltage causes a logic gate 55 to open thus allowing gate 41 associated with the counter 37 or 39 to open allowing clock pulses to be fed along line 35 to the counter 37 or 39. The ramp output voltage continues to rise until it exceeds the level of the rectified signal voltage from rectifier 54 at which time the output of the signal comparator 51 changes state. This change of state of signal comparator 51 results in closing of the gate 41 of the counter 37 or 39 stopping the flow of clock pulses.

The accumulated count of the counter 37 or 39 then represents the value of the signal voltage amplitude and hence the weight of the required counterbalance. The full scale reading of each counter 37 or 39 is 200 grams and this is arranged to be read in units of 5 grams so that each count accumulated represents 5 grams. The counter is arranged to count up to 40 and is decoded to give a three digit read-out. The accumulated count is held and displayed until the next reset pulse when the 37 and 39 and the ramp generator 49 are reset the counters being reset to zero and the reset pulse initiating the next sample.

Each counter 36, 37, 38 and 39 includes a number of resettable counting stages 56, one or more decoders 57 and a plurality of digital display tubes 58 the numbers displayed by which correspond to the states of the counting stages 56.

The apparatus as a whole is designed to be automatic in its operation insofar that, once the wheel is mounted on the shaft 10, and the width and diameter controls have been set, the operational cycle of the apparatus is initiated by a single push button 59 and is automatically stopped when the required measurements have been taken.

The sequence of events which takes place during an operational cycle are as follows:

the machine is started by depression of the start push button 59 which operates the start contactor of the motor 15 and enables the digital circuits to be initiated by the first reset pulse to occur as the shaft 10 begins to accelerate. The shaft assembly begins to vibrate and sampling takes place until an automatic shut-down procedure is initiated. As the wheel and shaft 10 approach their maximum speed a speed detector circuit 60 triggers a time delay 61 which is set so as to allow approximately 10 more samples to be taken before automatic shut-down occurs. The shut-down circuit includes a simple bistable memory 62 which is initiated at the end of the time delay period. A sample is taken every tenth revolution and providing the machine is on any revolution other than that on which the sample is being carried out, the machine is allowed to shut-down. By feeding the memory output into a gate 64, together with a signal from the pulse divider 29 to determine that the machine is not on a sample revolution, a signal can be produced at the output of gate 64 to shut down the machine, provided that the above conditions are satisfied. The signal is feed along a line 65 to each of the gates 40 and 41 to close the gates so that the accumulated counts are held. At the same time a signal is passed along a line 66 from gate 64 to a brake timer 67.

The brake timer 67 includes a relay which has normally closed contacts in series with the motor start contactor so that, when the brake timer is initiated, the motor start contactor is released and the motor current is switched off. The motor start contactor is interlocked with a second contactor which then becomes energized via a further contact of the brake timer relay. This second contactor switches a direct current into the motor windings which is derived from a transformer and a bridge rectifier to give dc injection braking of the motor to bring the wheel and shaft to rest.

The apparatus cannot be restarted until the brake timer has completed its timing period, ensuring that the largest wheel to be tested is brought to standstill and the dc braking current is removed from the motor. The digital information displayed by the tubes 58 will be held in a display state until a further testing procedure is started provided the power supply to the apparatus is not removed.

With the system described above the weight values and positions are displayed to an accuracy of plus or minus 2.5 grams for the weight values and plus or minus 2.5° for the weight positions.

As can be seen from the above the apparatus provides a simultaneous digit read-out of all the information required to balance a vehicle wheel and this information is stored on the digital displays until it is cancelled by the operator when he requires to balance a second wheel. Following the mounting of the wheel onto the machine, the time required to obtain the wheel balancing parameters is the time taken for the wheel to reach a constant speed of rotation, the speed detector 60 sensing a speed less than the maximum speed of rotation and the time, after the speed detector circuit initiates the time delay 61, taken for the wheel to be brought to rest.

The use of a toothed disc 23 to generate the clock pulses avoids the need for accurate speed control and stable frequency standards for analogue to digital conversion and the number of teeth on the disc determines the accuracy with which the counterbalancing parameters can be determined, the larger the number of teeth, the greater the accuracy with which the counterbalancing parameters can be determined.

I claim:

1. Apparatus for counter-balancing a wheel, comprising a rotary wheel-supporting and driving shaft; axially spaced, resiliently mounted bearings for the shaft; electrical transducers associated with the bearings to provide respective signals in dependence on the oscillations of the bearings; computing circuit means connected to the transducers to develop first and second analogue signals, the first signal representing the unbalance of the wheel in a first plane perpendicular to the driving shaft and containing one end face of the wheel and the second signal representing the unbalance in a second plane parallel to the first plane and spaced a distance therefrom; a reference pulse generator means to generate a pulse when the wheel is in a given angular position; an impulse generator means driven in timed relation with the shaft producing clock pulses synchronized with the rotation of the shaft; a first analogue to digital converter means connected to the output of the computing circuit means and the output of the impulse generator means to produce a pair of digital signals representing the amounts of unbalance in each of said planes; a second analogue to digital converter means connected to the output of the computing circuit means, the output of the reference pulse generator means, and the output of the impulse generator means to produce a pair of digital signals representing the angular location of the unbalance in each of said planes; counters connected to the outputs of the first and second analogue to digital converter means to provide digital read out of the magnitude and angular location of the unbalance in each of said planes; and a rotatable member having graduations and associated with the shaft to enable the shaft to be set to the angular position displayed by the counter representing the angular location preparatory to attachment of a counterbalance of the magnitude displayed by the counter representing the magnitude of unbalance.

2. Apparatus according to claim 1 wherein the impulse generator includes a first transducer to generate train of clock pulses and a second transducer to generate a train of reference pulse at less frequent intervals than the clock pulses, the analogue-to-digital converter circuits including gates operated by reset pulses derived from the train of reference pulses generated by the second transducer to initiate the count of clock pulses displayed by the magnitude digital counter and the angular position digital counter.

3. Apparatus according to claim 2 including a divider circuit connected to the second transducer to develop the train of reset pulses at a frequency such that the shaft executes a plurality of revolutions between successive reset pulses.

4. Apparatus according to claim 1, including a shaft speed detector circuit; and a time delay circuit connected to said detector circuit and to the gates of the analogue-to-digital converter circuits for completing the count of a predetermined number of clock pulse groups after the speed of the shaft has reached a predetermined value.

5. Apparatus according to claim 1 including two magnitude digital counters and two angular position digital counters, one magnitude counter and one angular position counter corresponding to each of said correction planes and being fed from said converter circuits to indicate, for each plane, the magnitude and the angular position of the counterbalance required.

* * * * *